UNITED STATES PATENT OFFICE.

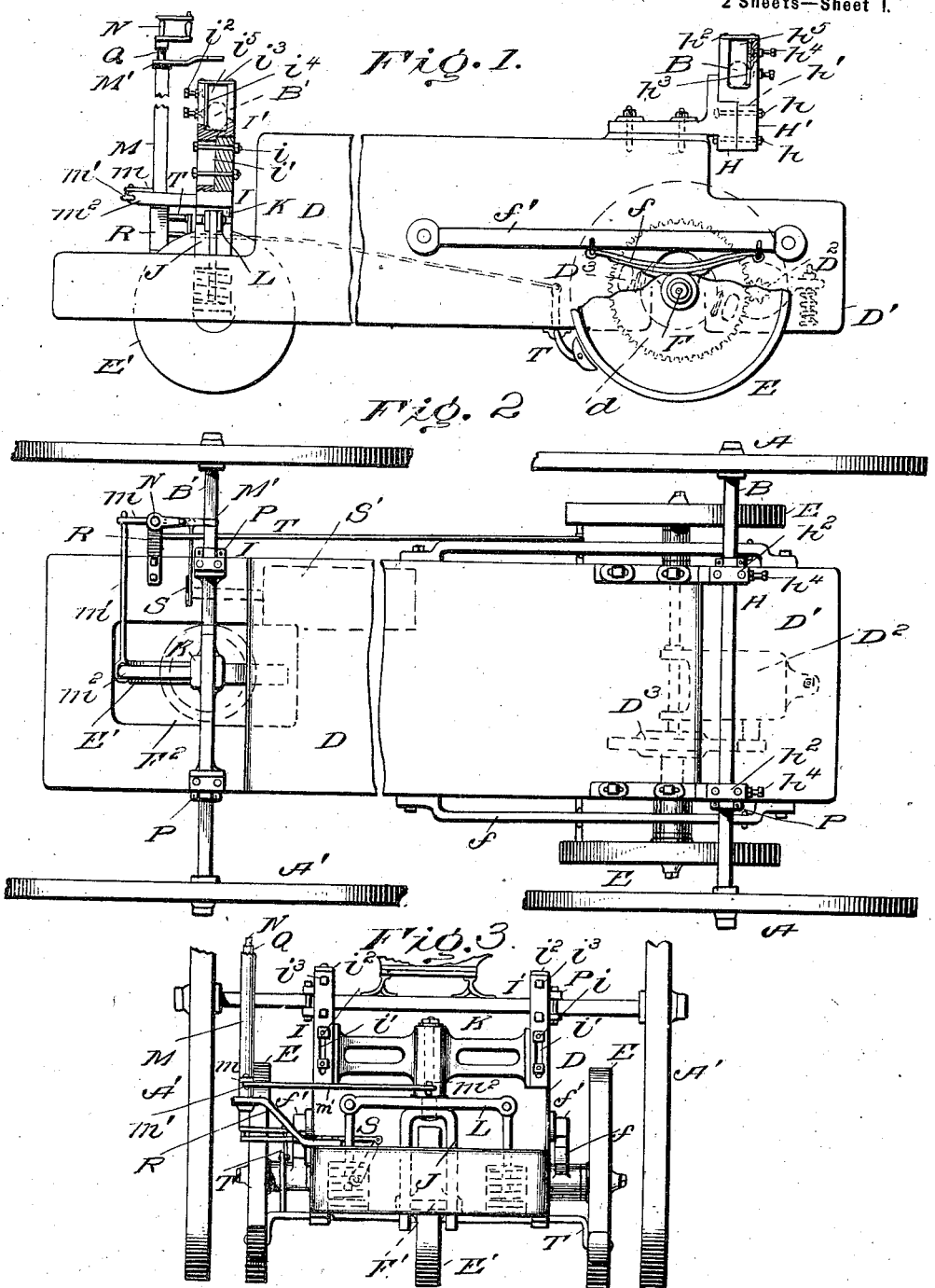

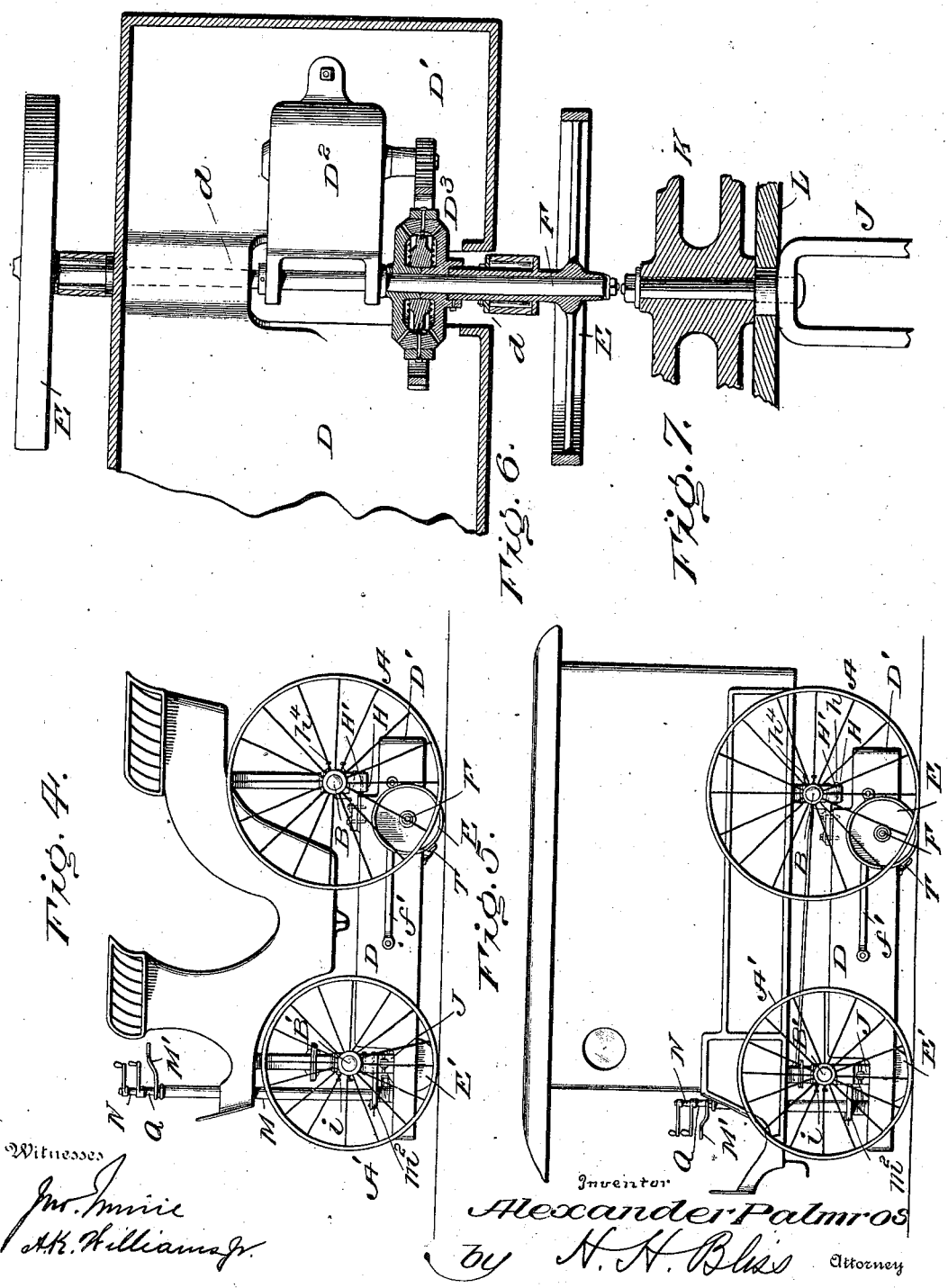

ALEXANDER PALMROS, OF COLUMBUS, OHIO, ASSIGNOR TO JOSEPH A. JEFFREY, OF SAME PLACE.

MOTOR-VEHICLE.

SPECIFICATION forming part of Letters Patent No. 683,977, dated October 8, 1901.

Application filed August 1, 1900. Serial No. 25,575. (No model.)

*To all whom it may concern:*

Be it known that I, ALEXANDER PALMROS, a citizen of Finland, residing at Columbus, in the county of Franklin and State of Ohio, have invented certain new and useful Improvements in Motor-Vehicles, of which the following is a specification, reference being had therein to the accompanying drawings.

This invention relates to improvements in mechanisms of the class applied to carriages, wagons, and similar vehicles for mechanically propelling them by power other than that of horses.

One of the objects is to provide an improved power apparatus which can be readily attached to and detached from an ordinary vehicle, so that it can be used either for propulsion by horses or by the said apparatus.

Figure 1 is a side view, partly in section, of a propelling or motor vehicle embodying my invention. Fig. 2 is a plan view of the same, parts of the running-gear of a carriage or similar vehicle being shown as connected therewith. Fig. 3 is a front view of the parts shown in Fig. 2. Figs. 4 and 5 are side elevations on a smaller scale, showing the propelling-vehicle connected with vehicles to be propelled. Fig. 6 is a horizontal section showing a part of the driving mechanism. Fig. 7 is a vertical transverse section showing a detail of the steering mechanism.

In the drawings I have shown parts of the body and running-gear of an ordinary vehicle, for it will be understood that the invention is embodied in a mechanism of such sort that it can be readily applied to a carriage, buggy, wagon, or similar vehicle of the ordinary sorts, one of the purposes being to provide a propelling device which can be readily and quickly applied to such vehicle without requiring any alteration or modification thereof.

A A indicate the rear wheels of such a vehicle, and A' A' the front wheels. The rear wheels are mounted on the axle B and the front wheels on the axle B', which, together with the other parts of the running-gear, can be of any usual or approved form. To these parts can be connected the motor or the motor-vehicle, for in the present construction the parts which are attached consist of a carriage or truck frame carrying the motor proper and the means for generating the power to actuate it. These may comprise an oil-engine and a tank for the oil or an electric motor and a battery for energizing. For sake of illustration I will herein consider that an electric motor and battery are used.

E E are two rear wheels upon an axle F, and E' is a front wheel upon an axle F', and these mediately or immediately support the truck-frame of the motor and the parts connected therewith.

D indicates the body of the motor-carriage, which in this case is a box or chamber containing the storage battery, and at D' there is an extension of the frame or box, in which is mounted the motor $D^2$. The latter is geared to the axle F of the driver, preferably by means of a compensating gearing, indicated as a whole by $D^3$, one part thereof being connected to the right-hand drive-wheel E and the other part being connected to the left-hand wheel. The mode of action of these parts is well known, they insuring that the power can be uniformly applied to the two ground driving-wheels irrespective of the speeds at which they travel, their speeds of rotation varying as the vehicle turns to the right or the left from the normal central line longitudinally.

Preferably the frame or boxing of the driving mechanism is recessed on the under side, as shown at $d$, to provide a free space for the axle F, and the connection between the latter and the frame and box is such as to permit the latter to rise and fall, this connection consisting of springs $f$ and spring-carrying bars $f'$. The motor is hinged to the axle at one side or end, and at its opposite side or end is flexibly connected with the frame or box, so that it will be held in uniform working relation with the gearing and at the same time properly joined to the frame.

The frame of the driving mechanism is provided with adjustable upward-extending standards, which are connected to the axles B and B' in such a way that there shall be a limited amount of vertical play of the frame with respect to the axle and yet have the joined parts held in proper relations to each other laterally. This can be accomplished in any suitable way. I have illustrated one method which can be followed. As shown, the motor-frame at the rear end has the standards H and the extension parts H', which are connected to the standards by the bolts $h$, there being vertical longitudinal slots at $h'$ to permit the part H' to be adjusted vertically, so that the apparatus can be applied to vehicles with axles relatively low or to others with their axles at a higher line. The upper part H' is slotted at its upper end, as shown at $h^5$. The upper end of the opening is closed by a bar or plate $h^2$. To hold the axle snugly in position, an adjustable plate, as at $h^3$, can be employed with adjusting and fastening devices, such as the bolts $h^4$. At the front end the frame has standards I with upwardly-projecting extensions I', adjustably secured to the standards by the bolts $i$ in the slots $i'$, and the extension having the slots $i^5$ for the axle B', the retaining-bar $i^2$, and the adjusting devices $i^3$ $i^4$. The front standards I, however, are not rigidly connected with the frame, but are joined by means of a cross plate or frame K, which carries the yoke J, that supports the front wheel E'. This wheel, its yoke J, the standards I, the front axle B', and the front wheels A' can all be turned or adjusted horizontally independently of the motor-frame to permit the steering of the vehicle. Such loose connection is shown as being provided by means of the frame-piece L, which has a bearing that receives a journal carried by the front swinging frame. This part L rests upon the yoke J of the front wheel, and thus provides support for the front end of the motor-frame. Preferably the motor-frame extends to the front of and around the front wheel E', there being a passage-way or aperture F² in the motor frame or box, in which are situated the wheel E' and its yoke J and which permits the wheel to be turned to the right or the left relatively to the motor-frame.

It will now be seen that the propelling mechanism can be readily and quickly applied to a vehicle, as it is merely necessary to place the truck beneath the running-gear of the carriage, and the clip-pieces H' and I' being moved or opened sufficiently to bring the axles B and B' into their proper positions over the parts below the attachment is effected by swinging the parts H' and I' up until they inclose the axle and then clamping them properly to the parts H and I and securing the retaining-bars H² and I².

By means of collars or clips, as shown at P P, secured to the axles the standards and extensions are prevented from moving laterally, although free to accommodate themselves vertically.

By having adjusting devices, such as those at $h^3$ and $h^4$ and at $i^3$ and $i^4$, or equivalent mechanism provision is made for meeting variations in the distances between the axles B and B', and the same motor can be applied to a vehicle having its axles relatively closer together and to another vehicle having its axles relatively farther apart.

The motor frame or box is also provided with the devices for steering, mechanism for operating the controller, and means for working the brake. These can be applied in any preferred way. As shown, there are three shafts M, N, and Q, preferably concentric with each other. They are mounted in a laterally-projecting standard or frame carried by the motor-frame, as shown at R, and are so situated as not to be interfered with by the floor or other parts of the vehicle and so that the handles or levers at M', N', and Q' shall be accessible to one in the driver's seat.

The shaft M is connected by a crank $m$, a link $m'$, and a crank $m^2$ to the above-described frame I J K, secured to the front axle, and the operator can by means of lever M cause these parts to turn the axle and the front wheels A' A' to the right or to the left for steering.

The shaft N is connected by the devices at S with the controller S', which in the details of its construction may be of any of the now well-known sorts.

The shaft Q is connected by the mechanism at T with the brake.

Having above described the several parts which constitute a mechanism embodying my improvements and the manner of attaching the motor-vehicle to the carriage and of disconnecting it therefrom, it will be unnecessary to describe the manner of operating it, as that will be fully understood from the above description and drawings.

I claim—

1. The herein-described motor-vehicle adapted to be attached to the running-gear of a carriage or other vehicle, it having the rear driving-wheels and the front laterally-adjustable wheel, in combination with a frame or body for supporting a battery, a motor geared to the driving-wheels and adjustable fastening devices at the rear and at the front for positively connecting it to the said running-gear, substantially as set forth.

2. The herein-described motor-vehicle adapted to be attached to the running-gear of a carriage or other vehicle, it having the rear wheels E and the front laterally-adjustable wheel, in combination with the body and frame, the motor connected to said frame and geared to the driving-wheels, the rear standards or frame, as at H, for adjustably connecting it positively to the running-gear of a carriage or other vehicle, and the front standards or frames I, I laterally adjustable relative to the motor-frame, and means for connecting the front standards with the running-gear of the carriage, substantially as set forth.

3. A motor-vehicle adapted to be connected to the running-gear of a carriage or other vehicle, it having a main frame or body, two rear wheels, a motor geared to the said wheels, means for adjustably connecting it to the rear axle of a carriage, a single front wheel up which the front end of the motor-vehicle rests, and means for connecting said front wheel to the front axle of said carriage, substantially as set forth.

4. A motor-vehicle adapted to be connected to the running-gear of a carriage or other vehicle, it having a main frame or body, a rear driving-wheel, a motor geared to the driving-wheel, means for connecting it to the rear axle of the carriage, a front wheel upon which the front end of the motor-vehicle rests, means for connecting the front end of the motor-vehicle to the front axle of said carriage, and steering devices supported on the motor-vehicle for turning the front axle of the carriage, substantially as set forth.

5. A motor-vehicle adapted to be connected to the running-gear of a carriage or other vehicle, it having a main frame or body, a rear wheel, a motor geared to said rear wheel, means for connecting it to the rear part of the running-gear of a carriage, a front wheel upon which the front end of the motor-vehicle rests, means for connecting the front end of the motor-vehicle to the front part of the running-gear of the carriage, means supported on the vehicle for steering the carriage, and means supported on the motor-vehicle for controlling the motor, substantially as set forth.

6. A motor-vehicle adapted to be adjusted and attached beneath a driven vehicle, and means for connecting the former with both the front and rear axles of the driven vehicle.

7. A motor-vehicle adapted to be adjusted and attached beneath a driven vehicle, and having means for connection with the steering or turning gear of the driven vehicle, and a steering mechanism, and having separate means for attachment with the other running-gear of the driven vehicle.

8. A driven vehicle having front and rear running-gear, one of which is adapted to be turned for steering, combined with a motor-vehicle, means for connecting the latter with said front and rear driving-gear, and a steering mechanism for operating the turning-gear of both the driven and motor vehicles.

9. A motor-vehicle adapted to be adjusted and attached beneath a driven vehicle, and means for connecting the former with both the front and rear running-gear of the driven vehicle, said connecting means being adjustable longitudinally of the said motor-vehicle.

10. A motor-vehicle adapted to be adjusted and attached beneath a driven vehicle, and means for connecting the former with both the front and rear running-gear of the driven vehicle, said connecting means being vertically adjustable.

11. The combination with a driven vehicle, of a motor-vehicle arranged beneath the former, and connections for rigidly uniting the two vehicles to each other at both their front and rear ends, the said connections being vertically adjustable relative to the motor-frame, substantially as set forth.

In testimony whereof I affix my signature in presence of two witnesses.

ALEXANDER PALMROS.

Witnesses:
LEOTA I. SAYLOR,
RYNOS HUTCHINS.